United States Patent [19]

Borja

[11] Patent Number: 4,578,091
[45] Date of Patent: Mar. 25, 1986

[54] MULTI-CHAMBERED AIR CLEANER

[76] Inventor: Antonio B. Borja, 1925 S. Corona, Denver, Colo. 80210

[21] Appl. No.: 602,598

[22] Filed: Apr. 20, 1984

[51] Int. Cl.$^4$ ............................................. B01D 47/14
[52] U.S. Cl. ........................................ 55/90; 55/233; 55/259; 55/316; 55/DIG. 30; 55/486; 60/310; 60/311
[58] Field of Search ......... 55/233, 259, 316, DIG. 30, 55/503, 504, 486, 90; 60/310, 311

[56] References Cited

U.S. PATENT DOCUMENTS

| | | | |
|---|---|---|---|
| 1,532,730 | 4/1925 | Chalupa | 55/DIG. 30 |
| 1,716,481 | 6/1929 | Bilsky | 55/DIG. 30 |
| 2,737,260 | 3/1956 | Jenison | 60/311 |
| 2,787,119 | 4/1957 | Giambruno | 60/311 |
| 2,932,157 | 4/1960 | Vilasenor | 60/310 |
| 3,417,549 | 12/1968 | Leosis | 60/311 |
| 3,548,591 | 12/1970 | McKay | 55/233 |
| 3,675,398 | 7/1972 | Giarrizzo | 55/DIG. 30 |
| 3,824,769 | 7/1974 | Santos et al. | 60/311 |

FOREIGN PATENT DOCUMENTS

| | | | |
|---|---|---|---|
| 223436 | 2/1962 | Austria | 55/DIG. 30 |
| 1953304 | 5/1971 | Fed. Rep. of Germany | 55/DIG. 30 |

*Primary Examiner*—Bernard Nozick
*Attorney, Agent, or Firm*—O'Rourke & Harris

[57] ABSTRACT

A multi-chambered air cleaning device is disclosed for removing particulate and other material from air passing through the device, as is a method for removing particulate and other matter from exhaust air. The device includes a front portion for collecting hot exhaust air to be cleaned and vaporizing the same to coagulate particulate matter in the air, and a back portion with a plurality of filters for removing the particulate material as well as other impurities such as gaseous odors. The device is particularly useful to clean air exhausted from a tail pipe connected with an internal combustion engine, and is also useful to clean gases emitted from pipes and/or stacks connected with combustion-type devices such as are commonly found in industrial plants.

15 Claims, 6 Drawing Figures

MULTI-CHAMBERED AIR CLEANER

FIELD OF THE INVENTION

This invention relates to an air cleaner and, more particularly, relates to a multi-chambered air cleaning device for removing particulate and other matter from hot exhaust air and a process for removing particulate and other matter from hot exhaust air.

BACKGROUND OF THE INVENTION

Air pollution has become a major problem, and many devices for cleaning, or purifying exhaust air have heretofore been suggested and/or utilized. While such devices have been suggested and/or utilized, for example, to remove particulate matter from the exhaust emitted by an internal combustion engine and from smoke stacks and the like of industrial plants, such devices have met only limited success, have been unduly complicated and expensive for general use, have not been adapted for replacement of filter sections while retaining intact other portions of the device, have required reconstruction of the combustion system to accomodate the air cleaning device, and/or have imposed undue restrictions on the combustion system so as to make the combustion system virtually inoperable in its intended manner.

SUMMARY OF THE INVENTION

This invention provides an improved air cleaning device that is relatively simple yet dependable in removing particulate and other matter from hot exhaust air, provides for filter replacement without requiring removal or replacement of other portions of the device, and does not require reconstruction of, or impose limitations upon, the combustion system.

It is an object of this invention to provide an improved air cleaning device and method.

It is another object of this invention to provide an improved air cleaning device and method for effectively removing particulate and other matter from hot exhaust gas.

It is still another object of this invention to provide an improved air cleaning device and method for effectively removing particulate and other matter from hot air exhausted from a combustion unit such as an internal combustion engine or a combustion-type furnace.

It is another object of this invention to provide an improved air cleaning device having a plurality of chambers for vaporizing incoming air to be cleaned to facilitate removal of particulate matter.

It is another object of this invention to provide an improved air cleaning device having a front section for vaporizing incoming air to be cleaned to form particulate matter and a rear section for capturing particulate matter.

With these and other objects in view, which will become apparent to one skilled in the art as the description proceeds, this invention resides in the novel construction combination, arrangement of parts and method substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings, together with the specification, illustrate complete embodiments of the invention according to the best mode so far devised for the practical application of the principles thereof and in which.

DESCRIPTION OF THE INVENTION

Figure 1:
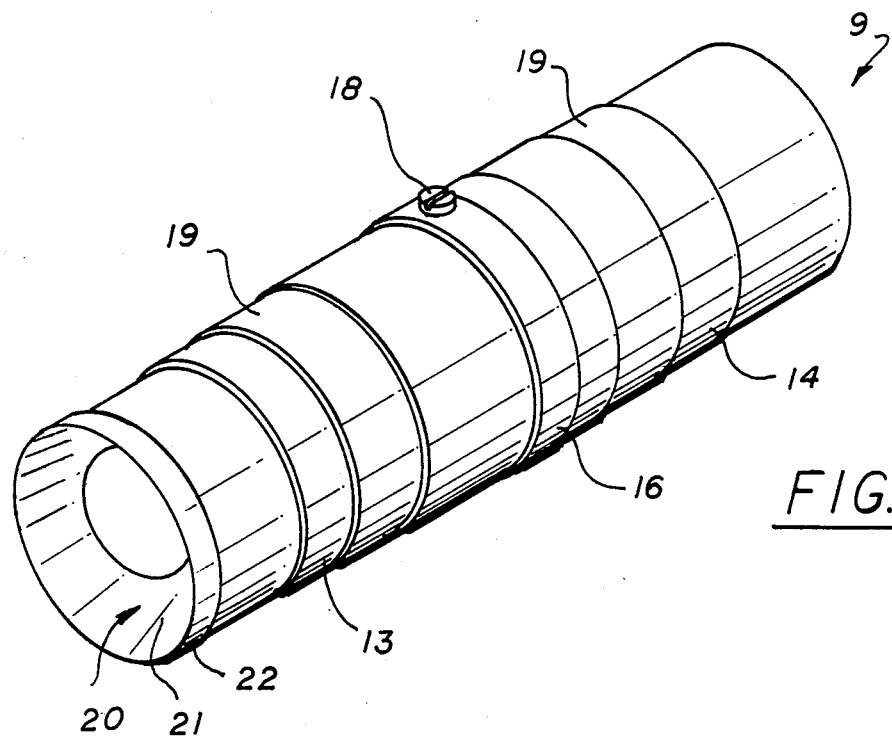
FIG. 1 is a perspective view of an assembled device of this invention adapted for use in conjunction with the tail pipe of a motor vehicle driven by an internal combustion engine to receive and remove particulate and other matter emitted from the tail pipe during operation of the engine.
Figure 2:
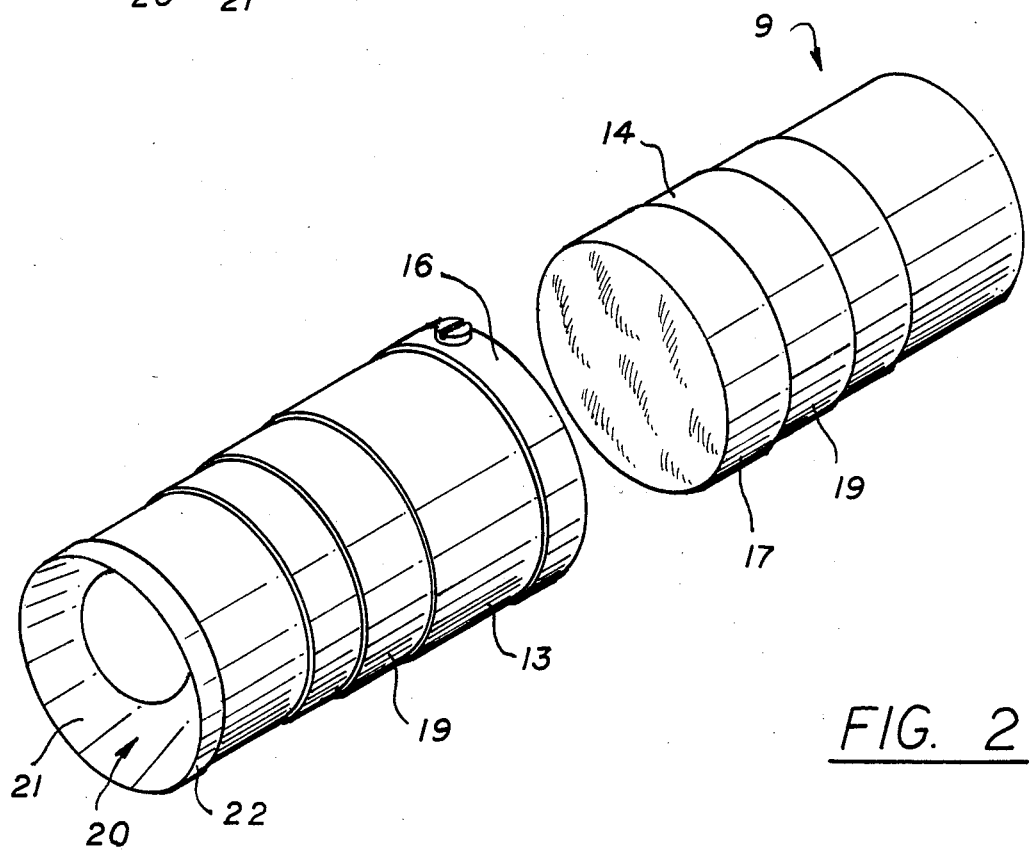
FIG. 2 is a side perspective similar to that of FIG. 1, but showing the device separated into a fixed, or retained, section and a disposable section.
Figure 3:
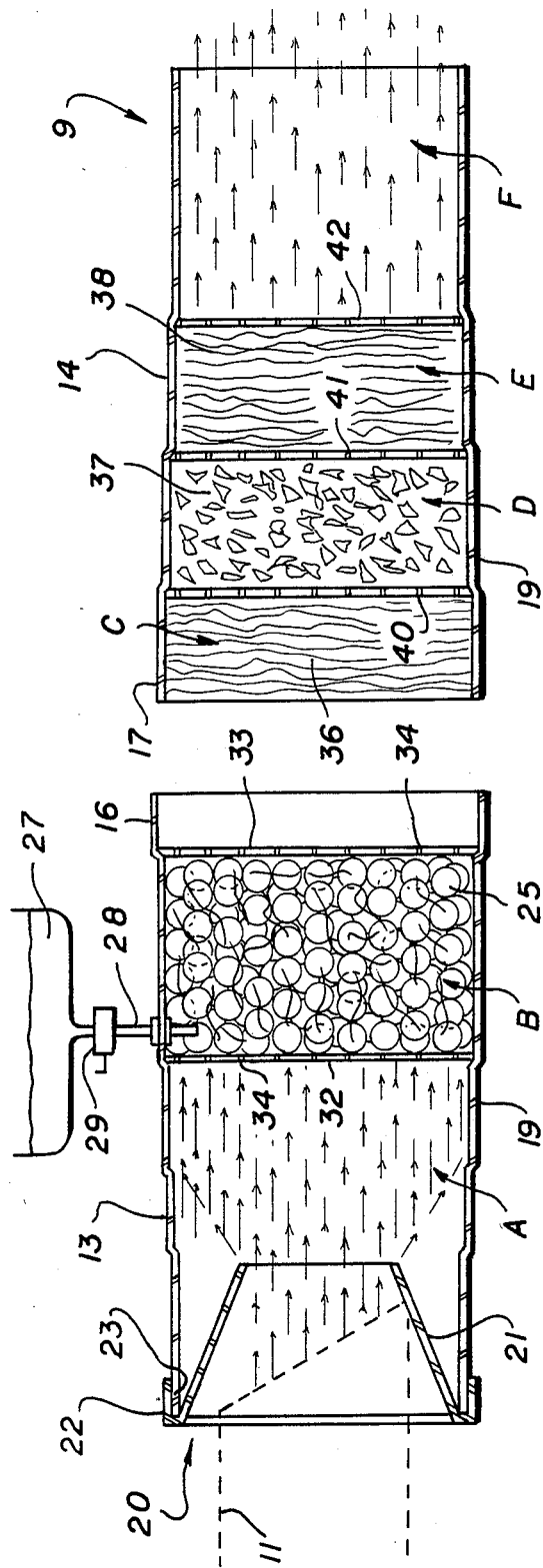
FIG. 3 is a cross sectional view of the device shown in FIG. 2 illustrating the chambers in each section.

Air cleaning device 9 shown in FIGS. 1 through 4, is particularly adapted for use in conjunction with an internal combustion engine, such as is commonly utilized to propel a motor vehicle to remove particulate matter and/or odors emitted from the tail, or exhaust, pipe of the vehicle. It is meant to be realized, however, that the air to be cleaned could be from any type of combustion device having a pipe, such as a pipe 11 as indicated in FIG. 3, through which exhaust air is emitted. Such a divice could include, for example, exhaust gas (normally air) from a gas, oil or coal combustion engine or gasses from a stack or the like such as is normally found in an industrial plant (or even from the combustion plant used for home heating or the like).

As shown best in FIGS. 1 and 2, air cleaning device 9 includes a front section 13 and a rear section 14 with front section 13 having a rearwardly extending cylindrical shoulder 16 which receives the front cylindrical edge 17 of rear section 14. When the front and rear sections are assembled, the sections are held together in conventional fashion, as by bolts 18, as indicated in FIG. 1. As indicated in FIGS. 1 and 2, front and back sections 13 and 14 may be canisters having outer walls 19 with gradually reduced sectional areas to facilitate dividing each section into chambers.

As shown best in FIG. 3, front section 13 is a fixed, or non-disposable, section which can be conventionally secured to a motor vehicle (not shown) so that the intake 20 of the air cleaning device receives the end of the tail pipe 11 therein without requiring that the tail pipe be fastened to, or sealed with respect to, the air cleaning device. As shown in FIG. 3, intake 20 is preferably defined by a rearwardly and inwardly extending cylindrical baffle 21 for directing the incoming exhaust air rearwardly into the chambers of the air cleaning device. Baffle 21 has a rearwardly extending cylindrical lip 22 at the front edge to allow the baffle to be secured to the front edge 23 of the device.

Front section 13 includes two chambers (designated A and B as shown in FIG. 3). Chamber A is a collecting chamber positioned immediately rearwardly of intake 20 and receives the hot exhaust air which is conducted and rearwardly toward and into chamber B.

Chamber B is a treating, or steam, chamber used to coagulate particulate matter in hot exhaust air. As indicated in FIG. 3, chamber B is filled with solid material 25, preferably a combination of spherical and sharp-edged material such as $\frac{5}{8}''$ diameter marbles and aluminum shavings, for example, which contact and divert the hot exhaust air to slow the flow (i.e., reduce the velocity) of the hot exhaust air as it passes through chamber B. Solid material 25 is heatable material and is heated during contact with the hot exhaust air as it passes through the treating chamber.

As also shown in FIG. 3, a source of liquid (normally water) 27 is provided above chamber B, and this liquid is metered into chamber B through conduit 28 and valve 29, which valve may be an electrically operated valve conventionally connected with the ignition control of a vehicle to meter the liquid into chamber B in any desired fashion (as, for example, by being proportional to time while the ignition is on).

In chamber B, the hot exhaust air generates heat when contacting the solid material in the chamber and this heat causes vaporization of the water in the chamber so that the chamber becomes a steam chamber. The steam coagulates the particles of combustion (hydrocarbons and other gasses) in the exhaust air which enables the particles to be captured in the rear, or disposable, section 14 of the device.

Figure 4:
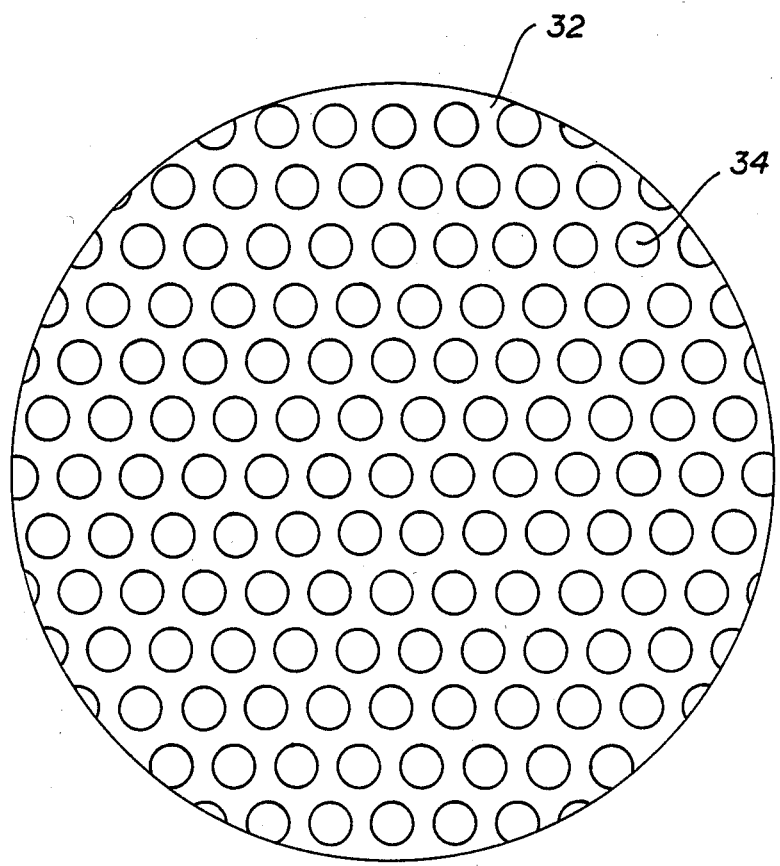
FIG. 4 is a typical end view showing a barrier or screen between chambers of the device as shown in FIGS. 1 through 3.

As also indicated in FIG. 3, chamber B is divided from chamber A at the front end of the chamber and from rear section 14 at the back end of the chamber by means of dividers, or screens, 32 and 33, which, as best shown typically for divider 32 in FIG. 4, includes a plurality of apertures 34 in the divider to allow the flow of exhaust air through the chambers.

Rear, or disposable, section 14 of the device includes a plurality of filter chambers C, D and E and an exhaust chamber F. Filter chamber C is filled with sponge-type material 36, and preferably includes a plurality of small sponges (either natural or artificial) while chamber D is filled with activated carbon 37, and chamber E is filled with non-treated filter material 38.

As indicated in FIG. 3, chamber C is positioned at the front portion (which includes front cylindrical edge 17) of the rear section 14 so that the filter material 36 in chamber C is brought into contact with divider 33 at the rear end of front section 13 when the device is assembled.

Chamber D is separated from chambers C and E by means of dividers, or screens, 40 and 41, while chamber E is separated from exhaust chamber F by means of divider, or screen 42, with each of the screens also having apertures therein in the same manner as indicated for screen 32 shown in FIG. 4.

When assembled, the hot exhaust air with the particulate matter therein discharged from front section 13 passes successively through filter chambers C, D and E. In chambers C and E, particulate matter is captured by the filter in each chamber and thus removed from the exhaust air, while other matter, or impurities, such as gaseous odors, are captured in filter D and thus removed from the exhaust air. Since chambers C and E are of different material, different particulate matter is captured by each filter and hence different types of particulate matter may be removed in a single pass of exhaust air through the air cleaning device.

In operation, the first, or fixed, section is positioned with the tail pipe extending slightly into the air cleaning device through the intake to the device. The rear, or disposable section (preferably with clean filters therein) is fastened to the front section and the device is then ready for use. When the ignition of the vehicle is turned on, water is metered into the treating chamber and with the motor running, hot exhaust air is fed through the collecting chamber to the treating chamber where the water is vaporized and the resulting steam coagulates particulate matter in the exhaust air moving through the treating chamber. The exhaust air with the particulate matter therein then passes through the three filter sections where particulate matter and/or odors are captured and the clean (or cleaner) air is then exhausted from the device through the exhaust chamber which is open-ended at the rear of the air cleaning device.

While the dimensions and shape of the air cleaner device may be varied as needed or desired for a particular application, a working embodiment having a canister, or cylindrical shape, with an overall length of about sixteen inches and an average diameter of about three and one-half inches was found to be successful for use with an automobile having a gasoline engine.

Figure 5:
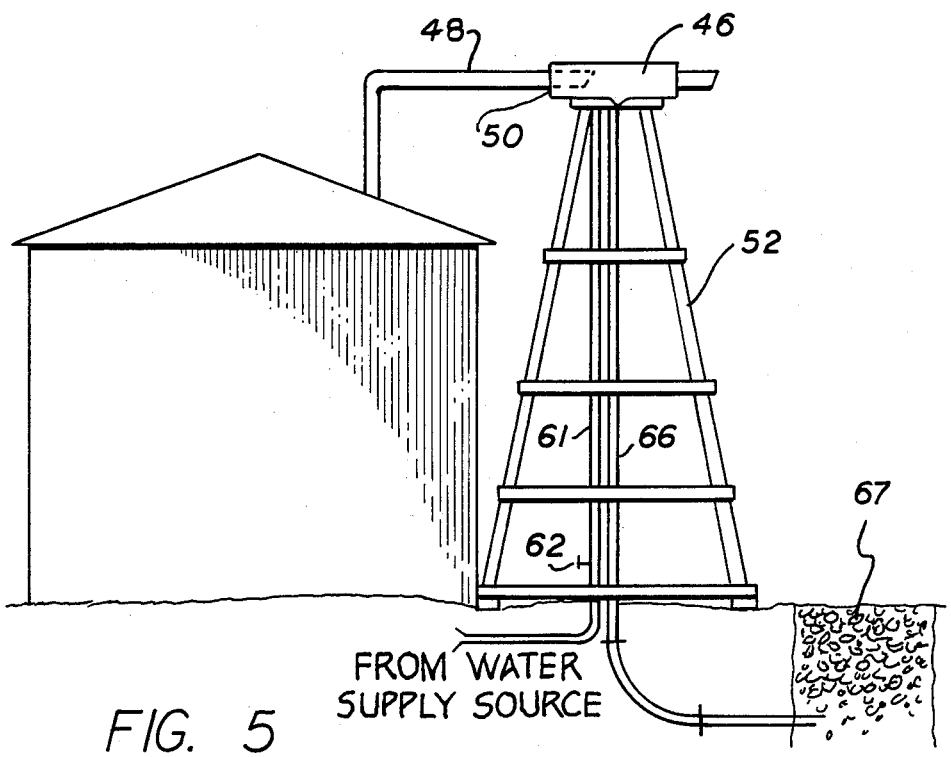
FIG. 5 is a side view of a typical embodiment of the air cleaning device of this invention adapted for use with a smoke stack to remove particulate matter emitted from the smoke stack during operation of a combustion unit connected with the smoke stack.

FIG. 5 shows an alternate embodiment 46 of the device of this invention adapted for use with a smoke stack 48 connected with a combustion device (not shown) such as a furnace of an industrial plant, which could be, for example, a steel mill, a paper mill, a coal gasification plant, or a power plant.

Figure 6:
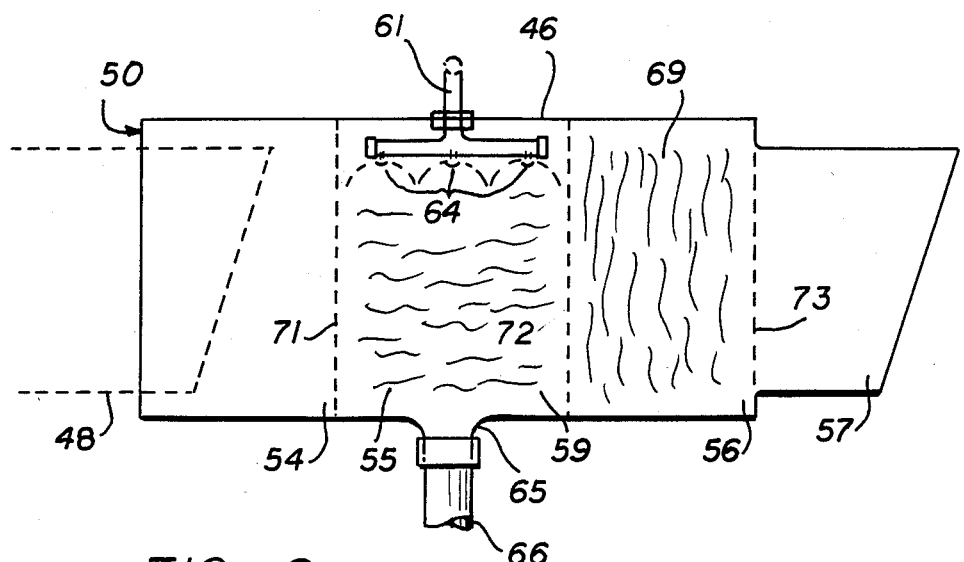
FIG. 6 is a cross-sectional view of the air cleaner device shown in FIG. 5.

As indicated in FIGS. 5 and 6, air cleaner device 46 includes an intake 50 which receives the free end of stack 48 in the same manner as described hereinbefore in connection with air cleaning device 9 receiving tail pipe 11 at intake 20 of the device. As indicated at FIG. 5, air cleaning device 46 may be positioned on tower 52 so that the device can receive the end of stack 48.

As shown in FIG. 6, air cleaning device 46 includes a collecting chamber 54, a treating chamber 55, a filter chamber 56, and an exhaust chamber 57. Collecting chamber 54 and exhaust chamber 57 are similar to that of collecting chamber A and exhaust chamber F, respectively, as discussed hereinabove with respect to air cleaning device 9.

Treating chamber 55 is similar to treating chamber B of air cleaning device 9 and is filled with solid material 59, but the solid material utilized is preferably aluminum shavings. In addition, water is metered into treating chamber 55 through a water supply line 61 having a valve 62 (which valve can be conventionally electronically operated or hand operated in conjunction with operation of the combustion unit) in the line with the valve being preferably located near ground level as indicated in FIG. 5. The incoming water is supplied through line 61 to a plurality of shower heads 64 which supply a fine mist to the treating chamber 55 at the top portion thereof as indicated in FIG. 6. A drain 65 is provided at the bottom of treating chamber 55, and drain 65 is connected through drain line 66 to a disposal area, such as gravel pit 67 (as indicated in FIG. 5).

Filter chamber 56 includes filters (not specifically shown of selected filter material 69) for removing particulate and/or other matter. Such filters may be the same type of filters as utilized in chambers C, D and E of air cleaning device 9, but may also be selected as needed for the particulate or other matter to be removed, as is known in the art.

Air cleaning device 46, as shown in FIG. 6, does not include a disposable section, but the filters could be made disposable if desired. In addition, while shown divided by apertured dividers 71, 72 and 73 in FIG. 6, could be left undivided, if desired or needed.

For use with a smoke stack or the like, the dimensions of air cleaning device 46 will vary depending upon the size stack, the size of the combustion unit, etc. In operation, however, the device will operate in the same manner as does air cleaning device 9 as described hereinabove.

In view of the foregoing, it is to be appreciated that this invention provides an improved air cleaning device that is particularly useful for cleaning hot exhaust air having particulate and other matter therein.

What is claimed is:

1. A process for removing impurities from hot exhaust air, said process comprising:
   providing treating chamber means having heat absorbing solid discrete particle material therein extending across the path of the treating chamber means;
   introducing water into said treating chamber means into contact with said discrete particle material;
   passing hot exhaust air through said treating chamber means with said hot exhaust air contacting said heatable solid material to slow the flow of said hot exhaust air and to heat the same to vaporize water in said treating chamber means to thereby coagulate particles of matter to be removed from said hot exhaust air; and
   passing said treated air with said coagulated particles of matter therein through at least one filter to remove said coagulated particles of matter from said air.

2. The process of claim 1 wherein said treating chamber means is positioned adjacent to the tail pipe of a vehicle whereby particulate matter is removed from said hot exhaust air emitted from said tail pipe.

3. The process of claim 1 wherein said treating chamber means is positioned adjacent to the free end of a stack emitting hot gas whereby particles of matter being emitted from said stack is removed from said hot gas discharged by said stack.

4. A multi-chambered gas cleaning device, comprising:
   treating section means for receiving and passing hot gas having particle impurities therein through said treating section means, said treating section means including heat absorbing solid discrete particle material extending across the path of said hot gas passing through said treating section means so that said hot gas heats said solid material at said treating section means and said solid material slows the flow of said hot gas while at said treating section means, and said treating section means further including means for introducing a liquid into said treating section means into contact with said discrete particle material with said liquid being contiguous to said solid material and said hot gas so that, when said received gas is at a sufficiently high temperature, said solid material is heated to cause said liquid to be vaporized to thereby coagulate the particle impurities in said hot gas to make said impurities more readily separable from said hot gas; and
   a filtering section for receiving said treated gas from said treating section means and passing said treated gas through said filtering section, said filtering section removing said more readily separable impurities therefrom as said gas is passed through said filtering section.

5. The device of claim 4 wherein said heatable solid particle material in said treating section means includes spherical solid materials for diverting and slowing the flow of received gas through said treating section means to facilitate treatment of said gas while in said treating section means.

6. The device of claim 4 wherein said received gas is exhaust air having particles of matter therein, and wherein said liquid is water that is vaporized by said hot exhaust air in said treating section means.

7. The device of claim 4 wherein said filtering section is removably secured to said treating section, and wherein said filtering section is disposable.

8. The device of claim 4 wherein said device is positionable adjacent to an exhaust pipe to clean hot exhaust air emitted from said exhaust pipe.

9. The device of claim 4 wherein said device is positionable adjacent to a stack to clean hot exhaust gas emitted from said stack.

10. The device of claim 4 wherein said filtering section includes a plurality of filters each of which successively receives said treated hot gas to remove different particulate and gaseous impurities therefrom.

11. The device of claim 10 wherein one of said filters is of sponge-type material, wherein a second one of said filters is non-treated filter material, and wherein a third of said filters is activated charcoal.

12. A multi-chambered air cleaning device, comprising:
    a collecting chamber for collecting hot exhaust air to be cleaned;
    water supply means;
    treating chamber means having heat absorbing solid discrete particle material therein, said treating chamber means having an inlet side communicating with said collecting chamber for receiving collected hot exhaust air therefrom and an outlet side for discharging treated hot air from said treating chamber means, said solid material extending across the path of the treating chamber means and slowing the flow of said hot exhaust air passing through said treating chamber means, and said treating chamber means being connected with said water supply means for receiving water therefrom to thereby come into contact with said discrete particle material so that said solid material in said treating area is heated by said hot exhaust air to thereby cause said water to be vaporized in said treating area to coagulate particles of matter in said hot exhaust air passing through said treating chamber means; and
    at least one filtering chamber to receive and pass treated air from said treating chamber means, said filtering chamber removing at least particles of matter in said treated air passing through said filtering chamber.

13. The device of claim 12 wherein said discrete material in said treating chamber means is at least one of spherical material and sharp-edged material.

14. The device of claim 12 wherein said water supply means includes metering means for metering the flow of water to said treating chamber means.

15. A multi-chambered air cleansing device for removing impurities from hot exhaust air emitted from a tail pipe of a motor vehicle, said device comprising:

a fixed section including a collecting chamber, positioned contiguous to but unconnected with the end of said tail pipe to receive said hot exhaust air therefrom, and treating chamber means, connected with said collecting chamber to receive and pass said hot exhaust air therethrough, said treating chamber means having therein at least one of heat absorbing spherical and sharp-edged solid discrete particle material extending across the path of the treating chamber means for contacting said hot exhaust air and being heated thereby while diverting and slowing the flow of said hot exhaust air, said treating chamber means also having means for introducing water within said treating chamber means coming into contact with said discrete particle material with said water being vaporized to coagulate particles of matter in said hot exhaust air while passing through said treating area; and a second section secured to said fixed section to receive treated air emitted from said treating chamber means, said second section including at least one filter receiving and passing said treated air therethrough, said filter capturing said particles of matter in said air passing through said filter.

* * * * *